No. 700,591. Patented May 20, 1902.
E. E. C. WERNER.
ICE CREAM FREEZER.
(Application filed June 10, 1901.)

(No Model.)

WITNESSES:

INVENTOR
Edward E. C. Werner
BY
ATTORNEY

THE NORRIS PETERS CO., PHOTO-LITHO., WASHINGTON, D. C.

United States Patent Office.

EDUARD EMILIUS CHRISTIAN WERNER, OF NEW YORK, N. Y.

ICE-CREAM FREEZER.

SPECIFICATION forming part of Letters Patent No. 700,591, dated May 20, 1902.

Application filed June 10, 1901. Serial No. 63,900. (No model.)

*To all whom it may concern:*

Be it known that I, EDUARD EMILIUS CHRISTIAN WERNER, a citizen of the United States, residing at New York city, (Manhattan,) in the county of New York and State of New York, have invented certain new and useful Improvements in Ice-Cream Freezers; and I do hereby declare the following to be a full, clear, and exact description of the invention, such as will enable others skilled in the art to which it appertains to make and use the same.

My invention relates to the construction of apparatus for making ice-cream, ices, and similar frozen substances.

The object of the invention is to facilitate the operation of making ice-cream, ices, and the like and to insure the exposure of all the material in the cream-can to the cold of the freezing mixture, thereby freezing the cream uniformly, consolidating the same, and imparting a smooth texture to the article.

Figure 1:
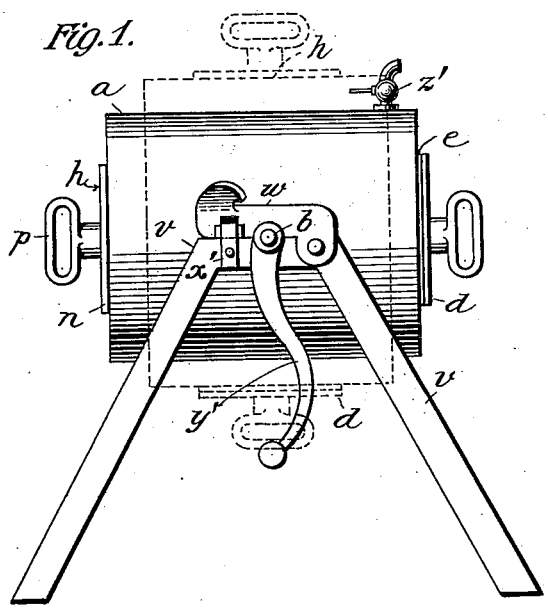
Figure 2:
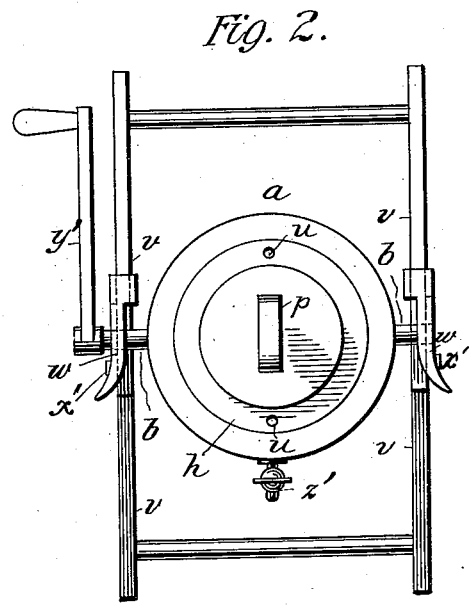
Figure 3:
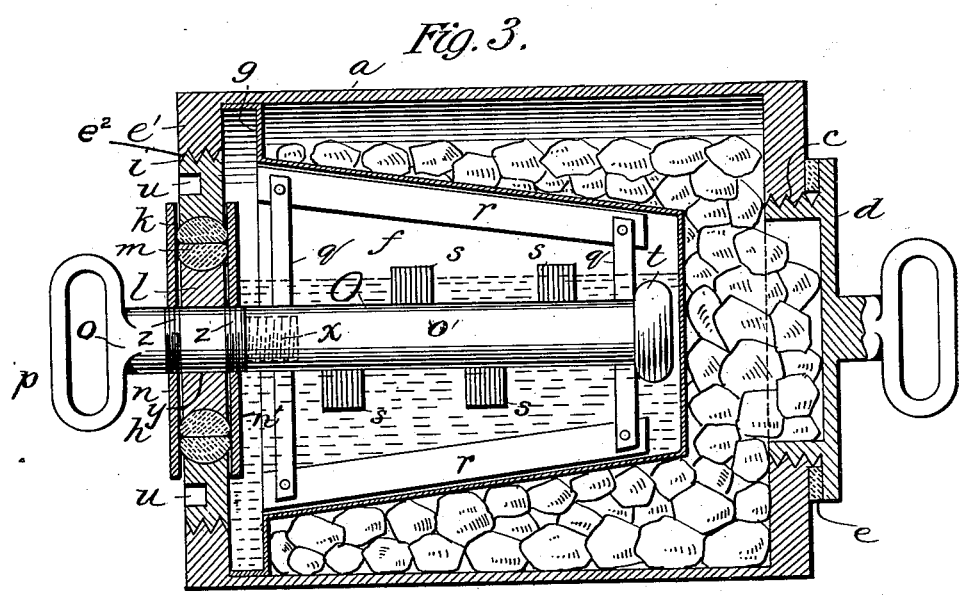

In the accompanying drawings, Figure 1 represents a side elevation of my improved ice-cream freezer, Fig. 2 a plan of the same, and Fig. 3 represents a vertical longitudinal section of the freezer.

Referring to the drawings, $a$ designates a cylindrical or other suitably-shaped vessel, which may be made out of tin, aluminium, or other suitable sheet or plate metal. This vessel is fitted with pivots $b\ b$, located in line with its transverse axis, on which the vessel is turned or revolved in the direction of its length or end over end. The bottom of the vessel is provided with a screw-threaded opening $c$, into which a flanged screw-cover $d$ is fitted and made water-tight by means of a rubber gasket $e$, placed around the outside of the opening under the flange of the cover. The top $e'$ of the vessel is also provided with a screw-threaded opening $e^2$.

Inside of the vessel $a$ is a cream can or receptacle $f$, made of sheet or plate metal or china, glass, or other fictile and non-corrosive ware. It is tapered more or less from its open top toward and down to its closed bottom. The top edge of this can or receptacle is turned outward and then upward to form a right-angled flange $g$, which is fitted accurately and closely to form a water-tight joint against the walls of the vessel $a$, to which it is fastened by solder or other suitable means directly under the top $e'$ and with its upper edge in contact therewith. This flange is an integral part of the can or receptacle, and if made of ware it can be fastened to the walls of vessel $a$ by other suitable means, so as to make a water-tight joint. The can or receptacle by the means stated is thereby suspended in the vessel $a$, and as it is considerably smaller than the vessel there is a space around it between its sides and bottom and the sides and bottom of the vessel $a$ in which the freezing mixture is placed, and owing to the water-tight joint between the flange of the can or receptacle and the walls of the vessel $a$ it is completely separated from the contents of the can or receptacle, and thus contamination of the cream by the freezing mixture is prevented absolutely.

The cream or other substance to be frozen is placed in the can or receptacle $f$ through the opening $e^2$, and this opening is provided with a cover $h$ of peculiar construction to adapt it not only to close the entrance to the can, but also to enable the contrivance for agitating the cream inside of the can or receptacle to be operated from the outside without danger of leakage. This cover consists of an outer annular ring $i$, having its outer periphery screw-threaded and its inner periphery grooved, and a center part or plate $l$ of less diameter than the ring, so as to fit within the latter and also leave room for the packing. The periphery of this center part or plate is grooved like the ring. Rubber packing-rings $k\ m$, half oval in cross-section, are placed in the respective grooves and press tightly against each other, so as to form a water-tight joint between the center part or plate and the ring of the cover. The two parts of the cover and the packing-rings are separably clamped together by means of the plates or disks $n\ n'$, held by the upper part of a central rod O. The center part or plate $l$ has a central perforation $y$, and the clamping plates or disks $n\ n'$ are similarly perforated and screw-threaded. The rod O has a handle $p$ on its upper and outer end. It is also screw-threaded at $z\ z'$, and it is made in two parts $o\ o'$, which are connected together at $x$ by means of a screw-joint, as indicated. The cover is put together and the parts secured by detaching the upper part $o$ of the rod from the part o', placing the center part of the cover inside the ring, compressing the packing-rings as much as required, screwing the upper plate or disk n on the part o of the rod, passing the part o down through the perforation y in the center part l, and screwing the lower disk n' on the part o up and against the under side of the cover. The disks n n' extend across both packing-rings and also partly over the ring i, and when screwed up tightly they clamp the rod, center part l, ring i, and packing-rings k m together and also compress the packing-rings, and thus make a water-tight joint between the disks and the cover. Cross-arms q q are connected with the part o' of the rod near its ends, and these arms are fastened at their extremities to the scraper-blades r r, which are parallel to and almost touch the walls of the can or receptacle f, clearance-space only being allowed between the edges of these blades and the walls. The scraper-blades are for the purpose of removing the frozen cream from the walls of the can or receptacle in order that the softer cream can reach the walls and be frozen equally with that removed. On the sides of the part o' of the rod are a number of flat projections s s s s, that form dashers for throwing the cream at the center outward and against the walls of the can. The scrapers and the dashers in this construction are suspended in the cream-can and there are no sockets or movable parts attached to the can to wear and become foul, and being connected with the cover when the latter is taken off they are removed with it and then can be completely dismembered for cleaning. On the inner end of the rod O, near the bottom of the can, is a knob t, that forms a counterbalance to the cover of the can and its contents.

The vessel a is placed in a frame v, with its pivots b b resting in suitable bearings in the top plates of the side members of the frame, and it is turned or revolved around its transverse axis by means of a crank y', applied to one of the pivots. Keepers or locks w w are pivoted at one end to the top plates of the side members of the frame adjacent to the pivot-bearings, and they are arranged to be turned down on top of the pivots and secured by spring-catches x' x'. The purpose of these keepers or locks is to hold the pivots on their bearings in the frame and prevent displacement of the vessel a when revolving or when the scrapers and dashers are rotated.

A faucet z' is inserted in the vessel a near the bottom for drawing off the water from the melted ice.

The apparatus is prepared for making ice-cream or other ices by turning the vessel to a vertical position, as indicated by the dotted lines, Fig. 1, with the cream-can uppermost. The cover, and with it the scraper, is removed, and the can is filled with the material to be frozen and the cover replaced, with the scraper in the cream-can, and screwed down tight. The vessel is then reversed to bring the cover of the ice-receptacle upward, and the cover being removed the receptacle is filled with the freezing mixture, (which may be composed of cracked ice mixed with one-third the quantity of rock-salt,) and when this is done the cover is replaced. The vessel is now revolved, (by hand and the crank or by any suitable mechanism—clockwork, for example.) The revolution of the vessel agitates the cream in the can by throwing it back and forth from top to bottom, and vice versa, of the can. The cream in contact with the walls of the can freezes first and adheres to the walls of the can, while that in the center is still liquid and freezes but slowly and unevenly, owing to the coating on the walls of the can if the agitation is confined to the back and forward motion only produced by the revolution of the vessel. To overcome this, at intervals the motion of the vessel is stopped and the scrapers and dashers rotated by means of the rod O. Thereby the frozen cream is removed from the walls of the can, and the liquid cream at the center is thrown outward against the walls, and it in turn is frozen, when the revolving of the vessel is resumed, and in turn adheres to the walls, from which it is removed by rotating the scraper. Thus by alternately revolving the vessel and rotating the scraper every particle of the cream may be exposed to about the same degree of cold, with the result of producing uniform freezing and consolidation of the cream, and by the kneading to which it is subjected by the scraper and dashers a fine texture is imparted to it. If it is desired to keep the ice-cream for several hours, the water is drawn off through the faucet Z', and the vessel being turned a half-revolution to bring the ice-receptacle upward the cover is removed and the vessel refilled with cracked ice mixed with one-eighth part of rock salt, the cover replaced, and the vessel set in the position indicated by Fig. 1, and allowed to remain in that position.

While the apparatus is designed primarily for making ice cream and other ices, it can also be used for cooling water and other beverages and liquors.

The annular part of the cover is provided with sockets u u to receive a spanner for removing the cover.

I claim—

1. The combination of a longitudinally-revoluble vessel, a cream-can suspended in the same having a closed bottom and an open top, an ice-receptacle surrounding the bottom and sides of the cream-can and revoluble therewith, openings provided with covers in the ends of the exterior vessel one of which gives access to the ice-receptacle and the other to the cream-can—the cover of the latter opening consisting of an exterior annular part, a perforated center part and packing-rings between the two parts of the cover—a rotatable rod passed down through the perforation in the center part of the cover and adapted to be rotated independently of the cover, disks screwed on the rod against the upper and under sides of the two parts of the cover that rotate with the rod, and scrapers connected with the rod in the cream-can, substantially as specified.

2. In an ice-cream freezer the combination of a frame, an exterior revoluble vessel provided with transverse pivots that rest in bearings in the said frame and on which the said vessel is revolved, a cream-can having a closed bottom and open top and right-angled flanges projected from the top and fastened to the side walls of the exterior vessel near one end thereof, an ice-receptacle surrounding the bottom and sides of the cream-can, screw-threaded openings in the ends of the vessel one of which gives access to the ice-receptacle and the other to the cream-can, a flanged screw-threaded cover for the opening into the ice-receptacle, a cover for the opening over the cream-can consisting of an annular part and a center perforated part—the outer periphery of the annular part being screw-threaded and the inner periphery grooved—and the outer periphery of the center part also grooved, packing-rings fitted into the grooves of the center and annular parts and bearing against each other, a screw-threaded rotatable rod provided with a handle passed down into the cream-can through the perforation in the center plate of the cover, and clamping-disks screwed on the said rod against the upper and under sides of the cover, and scrapers and dashers connected with the said rotatable rod inside of the cream-can, substantially as specified.

3. In ice-cream freezers a cover for the opening into the cream-can consisting of an annular part having its outer periphery screw-threaded and its inner periphery grooved, a perforated center part having its outer periphery grooved, packing-rings in the grooves of the center and annular parts that bear against each other, a screw-threaded rod passed through the perforation in the center part and clamping-disks screwed on the rod against the upper and lower sides of the center part, packing-rings and annular part of the cover, substantially as specified.

4. In an ice-cream freezer the combination with the cream-can of a cover consisting of an annular part having its outer periphery screw-threaded and its inner periphery grooved, a perforated center part having its outer periphery grooved, packing-rings in the adjoining grooves of the center and annular parts that bear against each other, a two-part screw-threaded rotatable and detachable rod passed down into the cream-can through the perforation in the cover, disks screwed to the upper part of the rod against the upper and lower sides of the cover, cross-arms connected with the lower part of the rod, scrapers connected with the ends of the cross-arms adjacent to and parallel with the walls of the cream-can and dashers connected directly with the lower part of the rod, substantially as specified.

In testimony that I claim the invention above set forth I affix my signature in presence of two witnesses.

EDUARD EMILIUS CHRISTIAN WERNER.

Witnesses:
ADAM WIENER,
F. C. ZOTTARELLY.